Patented July 25, 1933

1,919,778

UNITED STATES PATENT OFFICE

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN

GAS PURIFICATION

Application filed May 23, 1928. Serial No. 279,951.

This invention relates to a method of utilizing alkali metal hydroxide or a mixture of alkali metal hydroxides to purify the hydrogen-nitrogen gas mixture used in the synthetic ammonia process. Before purification the hydrogen-nitrogen gas mixture usually contains water vapor, carbon dioxide and/or other gaseous constituents which act to reduce the efficacy of the catalyst and the conversion efficiency. Among methods used heretofore to purify the gas mixture is the process of scrubbing with liquid ammonia, another being that of scrubbing with aqueous caustic soda. While the aqueous caustic soda scrubbing removes a large portion of the objectionable gases still it leaves moisture in the reaction mixture which is objectionable.

I have discovered an efficient gas purification method which utilizes coating the inner or contained surfaces of a gas purification chamber with anhydrous or near anhydrous alkali and then recoating same when the alkali thereon becomes spent, said coating being accomplished without introducing into the purifier or into the circulatory system, air or foreign gas or vapor of any kind.

To the accomplishment of the foregoing and related ends, the invention then consists of the steps and means hereinafter fully described and particularly pointed out in the claims, the annexed drawings and the following description setting forth in detail certain means and modes of carrying out the invention, such disclosed means and modes illustrating, however, but several of the various ways in which the principle of the invention may be used.

Figure 1:
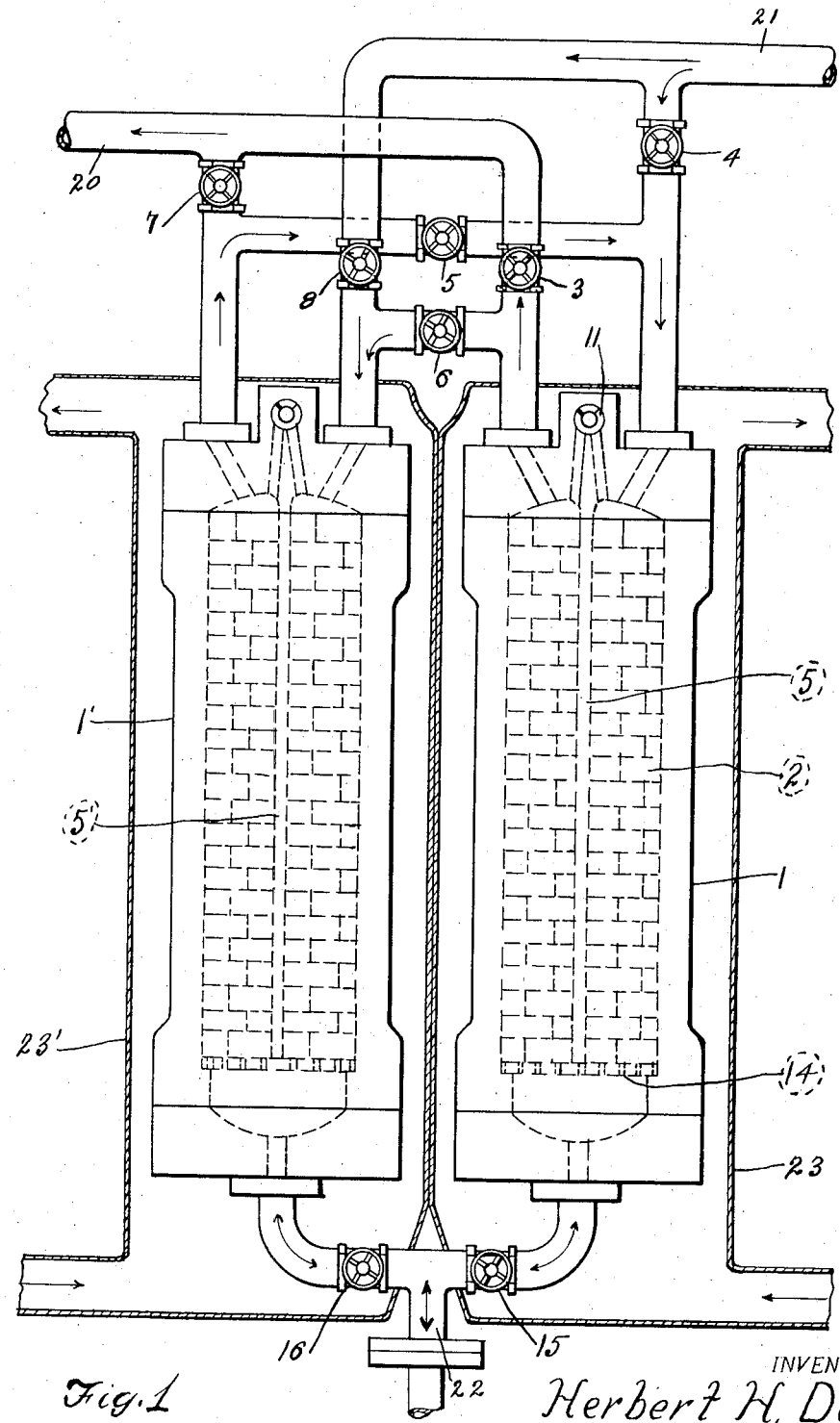
Fig. 1 shows in cross section one type of apparatus particularly adapted for use in this invention.

Fig. 1 shows two gas purifiers, or part of a series of purifiers, which are so connected that they can be used one at a time, or in series or in parallel. Gas purifier or vessel 1 (which is a duplicate of 1') contains a suitable filling material 2, such as metal rings, which may be placed systematically or dumped in heterogeneously. Partition 5 divides the purifier chamber into two sections so that the gas connections are all on the top of the purifier and a relatively long path made for the gas being purified. Perforated plate or grating 14 acts as a support for the filling material and allows free passage of the gas around the end of partition 5.

In order to present as much purifying surface as possible to the gases being purified, the purifiers will ordinarily be hooked up in series, for instance, by having valves 4, 6 and 7 open and valves 3, 5 and 8 closed, the gas flow will be from raw gas main 21 through valve 4 into purifier 1, around partition 5 and thence through valve 6 to purifier 1' and around partition 5' and thence through valve 7 to the purified gas main 20.

When the alkali coating in one of the purifiers, usually the first one of the series, becomes inefficient as may be determined in any well known manner, this purifier is cut out of the circuit for recoating while the gas to be purified is passed through the remaining purifiers. Having closed all valves leading to the inefficient purifier, for instance 1, it is ready for the recoating process. Valve 11 which acts as a vent and also as an overflow valve for molten alkali is then opened to vent the gases in the purifier to the source of raw gas supply, following which alkali inlet valve 15 is opened. Molten alkali from a suitable source is then forced into purifier 1 in any convenient manner through pipe 22 and valve 15 until the purifier is substantially full as may be determined in any well known manner. Valve 11 is then closed and the molten alkali allowed to drain through valve 15 and pipe 22 to a suitable receiver. A modification of this procedure is to leave valve 11 open and allow the molten alkali to overflow therethrough and thus flush away the impurities in the purifier, following which valve 11 is closed and the remaining molten alkali allowed to drain back through valve 15 and pipe 22 as described above. When starting to drain the molten alkali through valve 15 and pipe 22 in either case, valve 3 or 4 is cracked so that the purifier is filled with gas as fast as the molten alkali is withdrawn. Purifier 1 is then ready to be hooked into the circuit and is preferably so connected in the series that the gases being purified pass through it last before entering the purified gas main.

Figure 2:
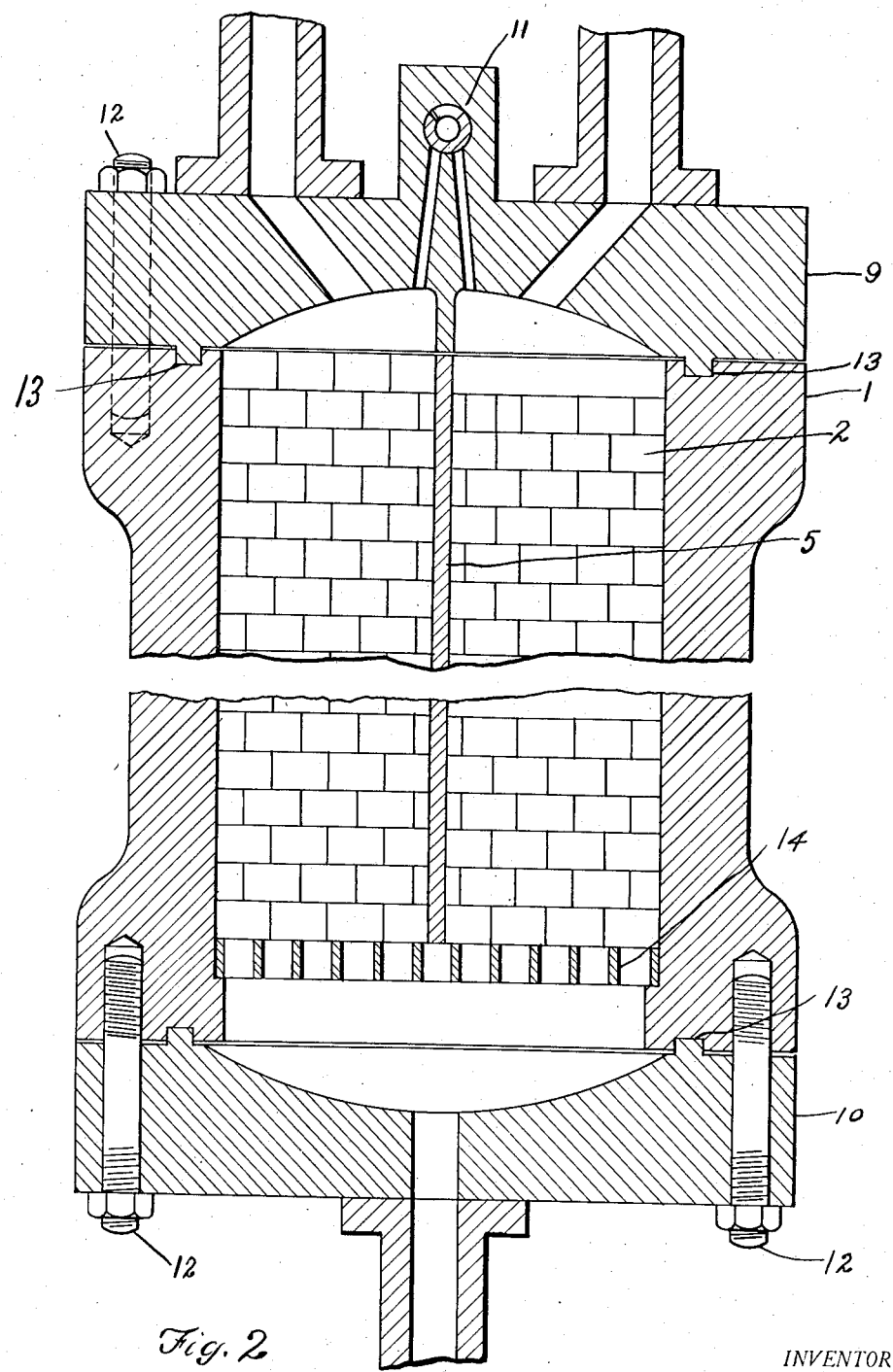
Fig. 2 shows the gas purifier in further detail.

Fig. 2 shows in further detail a cross section of purifier 1 of Fig. 1 wherein 9 and 10 are respectively the upper and lower purifier heads which may be held in place in any suitable manner such as with studs 12. Valve 11 which acts both as a vent for the gases in the purifier when filling same with molten alkali, and also as an equalizer and overflow for the alkali when flushing away impurities, may be of any suitable construction, one type of which is illustrated.

The purifier is packed at 13 or in any convenient manner so as to make it satisfactorily gas tight under operating conditions.

A modification of the purifiers illustrated in Fig. 1 can be made by extending one of the gas connecting pipes to the space below perforated plate or grating 14 which will thus eliminate the necessity of partition 5.

The purifier is preferably made of such form and construction as to facilitate recoating with alkali as well as to operate under the same pressure as utilized in the ammonia producing apparatus. When operating under this high pressure the handling of the raw gases to the purifier and thence to the ammonia producing apparatus is not only simplified but incidentally accomplishes better absorption of impurities than is possible under lower pressures.

The above described methods of recoating or regenerating the activity of the spent alkali, which may be either caustic soda, caustic potash or a mixture of the two, has the advantage of avoiding entrance into the system of air or other objectionable gases. If the chamber were to be opened to the air for removing spent alkali and recharging with broken, flaked or granulated alkali in any manner such as on trays, or as packing, air would be taken into the purifier and it would later be necessary to wash that air out with gases from the system, venting same to waste until the contaminating gas was removed.

While my invention can be used as the only purification for the raw gases used to produce synthetic ammonia, still it can in some cases be used to better advantage if the raw gases are given a preliminary washing such as with water or cuprous solution or both.

While either caustic soda or caustic potash can be used in this process I prefer to use a mixture of the two which operates satisfactorily and has a lower freezing point than either of the alkalis above. When employing alkali mixtures I prefer to use the mixture having the lowest melting point. This mixture which is commonly known as the eutectic mixture contains approximately 46.9 per cent of potassium hydroxide and has a melting point of approximately 185° C. The use of mixtures in itself allows the coating of the purifier elements to be handled at a relatively low temperature which from the standpoint of operation is desirable.

In order to minimize the difficulties encountered in handling molten alkali, as are well known to those versed in the art, each purifier is preferably provided with a jacket 23 which may be supplied with heat in any suitable manner such as for instance stack gases from the furnace which supplies heat for melting the alkali. This same jacket can also be used to cool the purifier as needed by passing therethrough cold air or other suitable cooling fluid. Likewise all pipes carrying the molten alkali are suitably lagged to prevent freezing during the alkali coating process.

While I have described my invention in terms of purifying hydrogen-nitrogen gas mixtures used in producing synthetic ammonia, I do not wish to be limited to that particular field as my invention is equally applicable to purifying any gas or gas mixture that may be purified by treatment with caustic soda, caustic potash or a mixture of the two.

Other modes of applying the principle of my invention may be employed instead of those explained, change being made as regards the method herein disclosed, provided the step or steps stated by any of the following claims or the equivalent of such step or steps be employed.

I therefore particularly point out and distinctly claim as my invention:—

1. In a method of purifying a gas by contact with alkali, the steps which consist in substantially flooding the surface within a suitable vessel with alkali metal hydroxide by substantially filling said vessel with molten alkali and then withdrawing excess of same while admitting the gas being purified, whereby said surface is coated with alkali and the excess thereof removed without introducing gas other than that being purified.

2. In a method of purifying a gas by contact with alkali, the steps which consist in coating a substantial portion of the surface within a suitable vessel with a mixture of caustic soda and caustic potash by substantially filling said vessel with said alkali mixture in molten condition and then withdrawing excess of same while admitting the gas being purified, whereby said surface is coated with alkali and the excess thereof removed without introducing gas other than that being purified.

3. In a method of purifying a gas by contact with alkali, the steps which consist in coating substantially all of the contained surfaces in a suitable pressure vessel with alkali metal hydroxide by filling said vessel with molten alkali and then withdrawing excess of same while admitting the gas being purified, whereby said surfaces are coated with alkali and the excess thereof removed without introducing gas other than that being purified.

4. In a method of purifying a hydrogen-nitrogen gas mixture by contact with alkali, the steps which consist in coating substantially all of the surfaces within a suitable vessel with alkali metal hydroxide by substantially filling said vessel with molten alkali and then withdrawing excess of same while admitting the gas being purified, whereby said surfaces are coated with alkali and the excess thereof removed without introducing gas other than that being purified.

5. In a method of purifying a hydrogen-nitrogen gas mixture by contact with alkali, the steps which consist in coating substantially all of the surfaces within a suitable vessel with a mixture of caustic soda and caustic potash by substantially filling said vessel with said alkali mixture in molten condition and then withdrawing excess of same while admitting the said gas mixture, whereby said surfaces are coated with alkali and the excess thereof removed without introducing other gas.

HERBERT H. DOW.